United States Patent [19]

Clyne et al.

[11] 4,233,703
[45] Nov. 18, 1980

[54] CLEANING DEVICE

[76] Inventors: John C. Clyne, 6 Leo Ave., Lurnea, New South Wales, Australia, 2170; William G. Steel, 27 Bertram Ave., Yagoona, New South Wales, Australia, 2199; Ronald T. Nicholls, 102 Wonga Rd., Lurnea, New South Wales, Australia, 2170

[21] Appl. No.: 30,590

[22] Filed: Apr. 16, 1979

[30] Foreign Application Priority Data

Nov. 3, 1978 [AU] Australia ............................ PD6629

[51] Int. Cl.³ ............................................. B60S 3/06
[52] U.S. Cl. ............................. 15/53 B; 15/DIG. 2
[58] Field of Search ................ 15/DIG. 2, 2 A, 53 B, 15/58, 88

[56] References Cited

U.S. PATENT DOCUMENTS

| 570,610 | 11/1896 | Schock | 15/58 |
| 1,770,201 | 7/1930 | Eaton | 15/58 |
| 3,729,763 | 5/1973 | Coley | 15/53 B |
| 3,903,559 | 9/1975 | Kuster | 15/53 B |

FOREIGN PATENT DOCUMENTS

| 2724593 | 7/1978 | Fed. Rep. of Germany | 15/DIG. 2 |
| 480209 | 12/1969 | Switzerland | 15/DIG. 2 |

Primary Examiner—Edward L. Roberts
Attorney, Agent, or Firm—Sprung, Felfe, Horn, Lynch & Kramer

[57] ABSTRACT

A device for use in cleaning the wheels of golf buggies. The device comprises driven rollers which are arranged to support the vehicle's wheels and to induce rotation of the wheels by peripheral engagement. A brush is located between the rollers for contacting and wiping the wheels of the vehicle when the vehicle is mounted to the rollers, the brush being driven to rotate with a peripheral velocity different from that which is imparted to the vehicle wheels by the driven rollers. Subsidiary driven brushes are mounted to the device for use in cleaning golfing accessories, such as golfclubs, and golfer's shoes.

10 Claims, 3 Drawing Figures

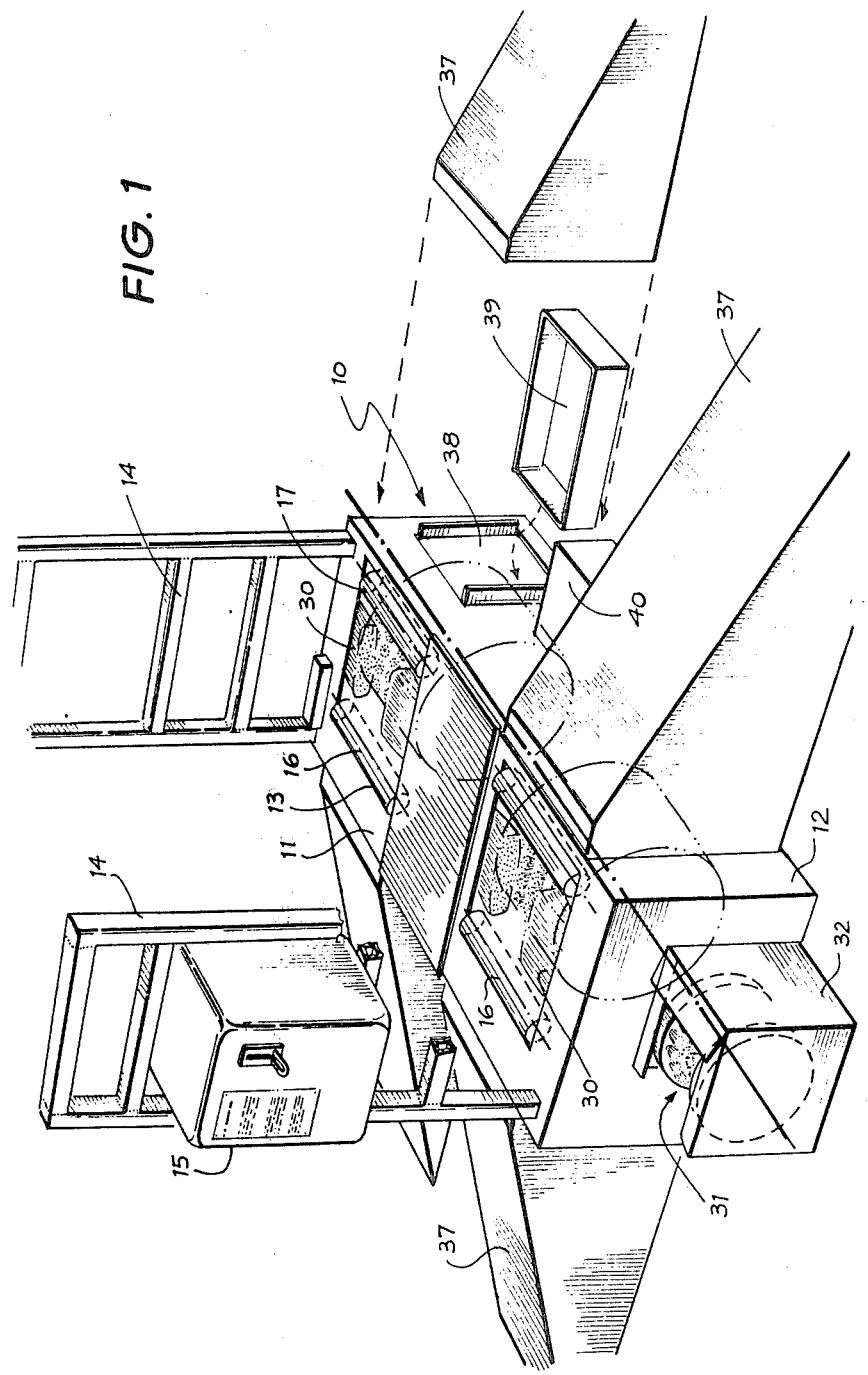

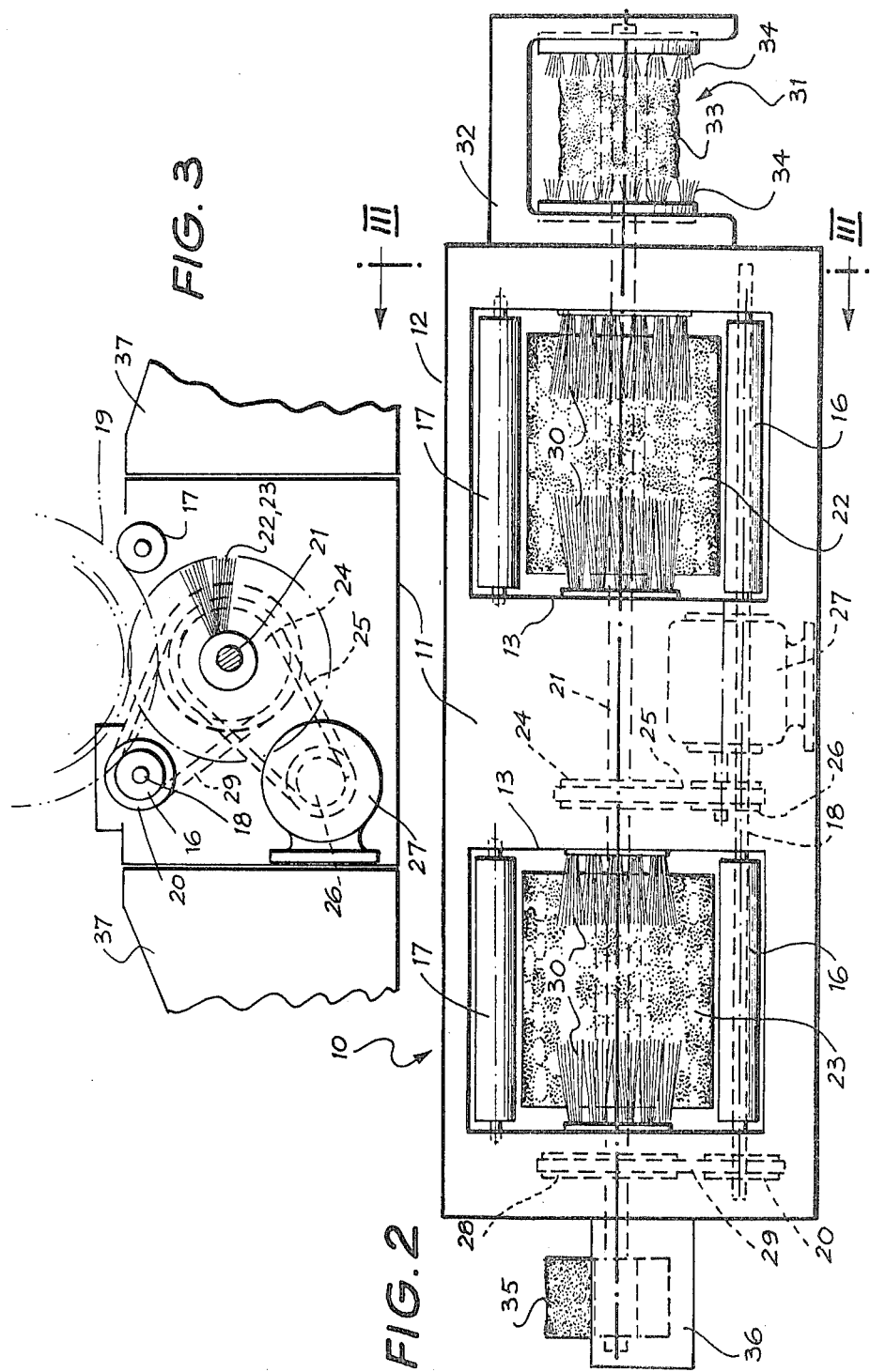

CLEANING DEVICE

FIELD OF THE INVENTION

This invention relates to a device for use in the cleaning of the wheels of wheel-mounted vehicles or carriages, hereinafter referred to generally as vehicles. The device has been developed primarily for use in cleaning the wheels of vehicles that are used for carrying golf-clubs, i.e. golf buggies, but it will be appreciated that the device need not be limited to this application.

In the context of golf buggies, the device is intended for removing dirt, mud, grass and other deposits from the wheels before the buggy is stowed or collapsed for stowage and transport.

BACKGROUND OF THE INVENTION

Various mechanical devices are known for use in removing clinging mud or other deposits from a wearer's boots or shoes and for polishing shoes. The former devices are to be found in the lobby of such buildings as alpine lodges or riding school dormitories, and the latter devices are frequently located in hotel corridors. Other devices are known for use in cleaning the wheels of vehicles, such devices comprising brushes which are mounted to automatic automobile washing rigs and which are actuated to engage with the exposed face (i.e. the wheel hub cap and dress rims) of the wheels of an automobile.

However, no devices are known by the inventors to be suitable for cleaning mud and other deposits from the periphery of the wheels of a gold buggy, and the present invention seeks to meet a need for such a device.

SUMMARY OF THE INVENTION

The present invention provides a device for use in cleaning the wheels of vehicles and which comprises spaced-apart substantially parallel rollers which are arranged to support the periphery of the vehicle's wheels. One at least of the rollers is arranged to be rotatably driven for inducing rotation of the vehicle wheels when supported by the rollers, and a wiper element is located intermediate the rollers and disposed for contacting and wiping the wheels of the vehicle when mounted to the rollers.

In accordance with a particular aspect of the invention, two pairs of parallel spaced-apart rollers are provided, one pair for each of two wheels of the vehicle. Then, two wiper elements may be provided, one being located between the rollers of each pair.

PREFERRED FEATURES OF THE INVENTION

The wiper element preferably comprises a brush and most preferably a rotatable brush which, in operation of the device, is driven to rotate relative to the vehicle's wheels. Rotation of the brush may be in the direction of rotation of the vehicle's wheels or in the opposite direction, provided that relative rotation is effected. Preferably, the brush is caused to rotate in a direction opposite to that of the direction of rotation of the vehicle's wheels.

Rotational drive is preferably imparted to the roller and the brush by an electric motor which is energised when the vehicle is mounted to the cleaning device. Energisation of the motor may be effected by a coin freed actuating mechanism.

The rollers and the brush are preferably located within a steel frame or an enclosure which has a top opening to permit driving contact between the rollers and the vehicle's wheels. A collector may be located within the enclosure for collecting material that is brushed from the vehicle wheels.

The cleaning device may be mounted below or above ground level. In the latter case, a ramp is preferably provided to permit the vehicle to be wheeled onto the cleaning device. When ramps are provided, the above-mentioned collector may be built into the structure below the ramp.

One or more subsidiary brushes may be mounted to the cleaning device for use, for example, for cleaning shoes or golfclubs. Such subsidiary brush or brushes would normally be located outside the abovementioned enclosure but would be driven from a shaft which mounts one of the rollers or which mounts the rotatable brush.

The invention will be more fully understood from the following description of a preferred embodiment of a device for use in cleaning the wheels of a golf buggy. The description is given with reference to the accompanying drawings.

BRIEF DESCRIPTION OF THE DRAWINGS

In the drawings,

FIG. 1 shows a perspective view of the cleaning device,

FIG. 2 shows a plan view of the device shown in FIG. 1, with ramp elements removed therefrom, and FIG. 3 shows an end elevation view of the device, as viewed in the direction of section plane 3—3 shown in FIG. 2.

DETAILED DESCRIPTION OF THE INVENTION

As shown in the drawings, the cleaning device comprises a metal enclosure 10 having a top cover 11 and side walls 12. The top cover is formed with two rectangular openings 13 and is fitted with upwardly extending side frames 14. One of the side frames carries a coin freed switching mechanism 15, into which a coin is fed when the device is to be operated. The coin freed switching mechanism may be of a type which is known per se and it is connected in circuit with an electric motor to which reference is to be hereinafter made.

Located within the enclosure are two pairs of spaced-apart parallel rollers 16, 17. The rollers are located within the margins of the openings 13 and immediately below the surface of the top cover 11. One of the rollers 16 of each pair is coupled to a drive shaft 18 and the other roller 17 of each pair is mounted as an idler roller.

The rollers 16 and 17 of each pair of rollers are disposed to support and cradle wheels 19 of a buggy, as indicated in FIG. 3, when the buggy is mounted to the cleaning device. The rollers 17 are supported by bearing blocks (not shown), as is the drive shaft 18 which mounts the rollers 16. A belt pulley 20 is mounted to the drive shaft 18.

A further shaft 21 is located between and below the rollers 16 and 17 and extends for a length exceeding that of the enclosure 10. This shaft is also supported by bearing blocks (not shown) and it carries two longitudinally spaced rotatable brushes 22 and 23. The brushes 22 and 23 are located below the openings 13 in the enclosure and they have radially projecting flexible wipers or bristles which extend outwardly toward the top cover 11 of the enclosure.

The brush shaft 21 is fitted with a first belt pulley 24 which is coupled by a drive belt 25 to the pulley 26 of an electric motor 27. A second pulley 28 is also mounted to the brush shaft 21 and is connected by a drive belt 29 to the pulley 20 on the roller shaft 18.

Four fixed brushes 30 are secured to the underside of the enclosure cover 11, the fixed brushes being mounted as confronting pairs and having their bristles projecting into the zones defined by the openings 13. These zones may be referred to as cleaning zones. The rotatable brushes 22 and 23 are provided for cleaning the periphery of the wheels 19, and the fixed brushes 30 are provided for cleaning the side walls or spokes of the wheels 19. Engagement of the fixed brushes 30 with the wheels is effected by moving the buggy longitudinally of the device while its wheels 19 are carried by the rollers 16, 17 and whilst rotation is being imparted to the wheels 19.

Located at one end of the enclosure 10 is a secondary brush 31. This is mounted to a projecting end of the brush shaft 21 and is located within a compartment 32. The brush 31 is intended for use in cleaning a golfer's shoes and it has both radially and longitudinally projecting bristles 33 and 34 respectively. The longitudinally extending bristles 34 are disposed outside the periphery of the radially projecting bristle 33 and hence are arranged to brush and clean the sides of a wearer's shoe.

A tertiary brush 35 is located at the opposite end of the casing 10, as shown in FIG. 2. This also is mounted to the brush shaft 21 and it is located, in part, within a housing 36. The brush 35 has radially projecting bristles only and it is intended for use in the cleaning of the head of a golfclub.

As is shown in FIG. 1 of the drawings, four ramps 37 are provided for wheeling a buggy onto and from the cleaning device. The ramps are detachably mounted to the side walls of the device and can be removed for transportation or cleaning purposes. FIG. 1 shows one of the ramps removed from the device.

Apertures 38 are located in the side walls of the device and are closed when the ramps are fitted, and trays 39 are inserted through the apertures to locate below the cleaning brushes 22 and 23. The trays are provided for collecting material that is brushed from the wheels of a buggy during a cleaning operation, and the trays can be removed from the device to permit disposal of collected material.

Steps 40 are also provided, one at each side of the device between the ramps 37.

In operation of the cleaning device, the wheels 19 of a golf buggy are rested on the rollers 16 and 17 of each pair of rollers, and the motor 27 is energised. This results in rotational drive being imparted to both of the brushes 22 and 23 and to the roller 16 of each pair of rollers. Rotation of the rollers 16 causes rotation of the buggy wheels 19 and the idler rollers 17, but the buggy wheels are rotated at a peripheral velocity which is less than that of the brushes 22 and 23. Thus, relative rotation is effected between the brushes and the buggy wheels, and wiping of the wheels results.

Drive imparted to the brushes 22 and 23 is also imparted to the brushes 31 and 35, for the purposes above stated.

We claim:

1. A cleaning device for use in cleaning the wheels of a vehicle which has wheels which are rotatable about a common axis, the device comprising:
    an enclosure which is provided with two openings in an upper horizontal surface thereof, the openings defining cleaning zones, two pairs of spaced-apart substantially parallel rollers located within the enclosure, the rollers being disposed within the cleaning zones to support respective wheels of the vehicle, means for driving at least one roller of each pair whereby rotation of vehicle wheels is induced when the vehicle is supported by the rollers, a wiper element in the form of a rotatable brush located between the rollers of each pair and having an axis of rotation disposed parallel to the axes of rotation of the rollers, the wiper element being disposed within the cleaning zones and being arranged to contact and wipe the vehicle wheels when mounted to the rollers, means for imparting rotational drive to the wiper element, and at least one fixed brush located within each of the cleaning zones, the fixed brushes being located immediately below the respective openings in the enclosure and having bristles extending parallel to the axis of rotation of the wiper element.

2. A cleaning device as claimed in claim 1 wherein the rotatable brush is driven to rotate with a peripheral velocity which is different from the peripheral velocity of the driven rollers.

3. A cleaning device as claimed in claim 1 or claim 2 wherein rotation is imparted to the brush in a direction opposite that which is imparted to the vehicle wheels by the driven rollers.

4. A cleaning device as claimed in claim 1 wherein rotational drive is imparted to the rollers and the rotatable brush by an electric motor which is energised by way of a coil-freed switching mechanism.

5. A cleaning device as claimed in claim 1 wherein there are two said rotatable brushes, one being exposed by each of the openings.

6. A cleaning device as claimed in claim 5 wherein the rotatable brushes are mounted to a shaft which extends throughout the length of the enclosure and beyond end walls thereof and wherein subsidiary rotatable brushes are mounted outside the enclosure and to respective ends of the shaft.

7. A cleaning device as claimed in claim 6 wherein at least one of the subsidiary brushes has radially and longitudinally projecting bristles.

8. A cleaning device as claimed in claim 1 wherein the device includes ramps which extend upwardly to the horizontal surface of the enclosure.

9. A cleaning device as claimed in claim 1 wherein collector trays are located within the enclosure, one below each of the cleaning zones.

10. A cleaning device as claimed in claim 9 wherein the collector trays are removable from the enclosure.

* * * * *

UNITED STATES PATENT AND TRADEMARK OFFICE
CERTIFICATE OF CORRECTION

PATENT NO. : 4,233,703

DATED : 11/18/80

INVENTOR(S) : John C. Clyne et al

It is certified that error appears in the above-identified patent and that said Letters Patent are hereby corrected as shown below:

Col. 4, line 41, "coil" should be --coin--.

Signed and Sealed this

Seventeenth Day of March 1981

[SEAL]

Attest:

RENE D. TEGTMEYER

*Attesting Officer*   *Acting Commissioner of Patents and Trademarks*